United States Patent Office 2,885,345
Patented May 5, 1959

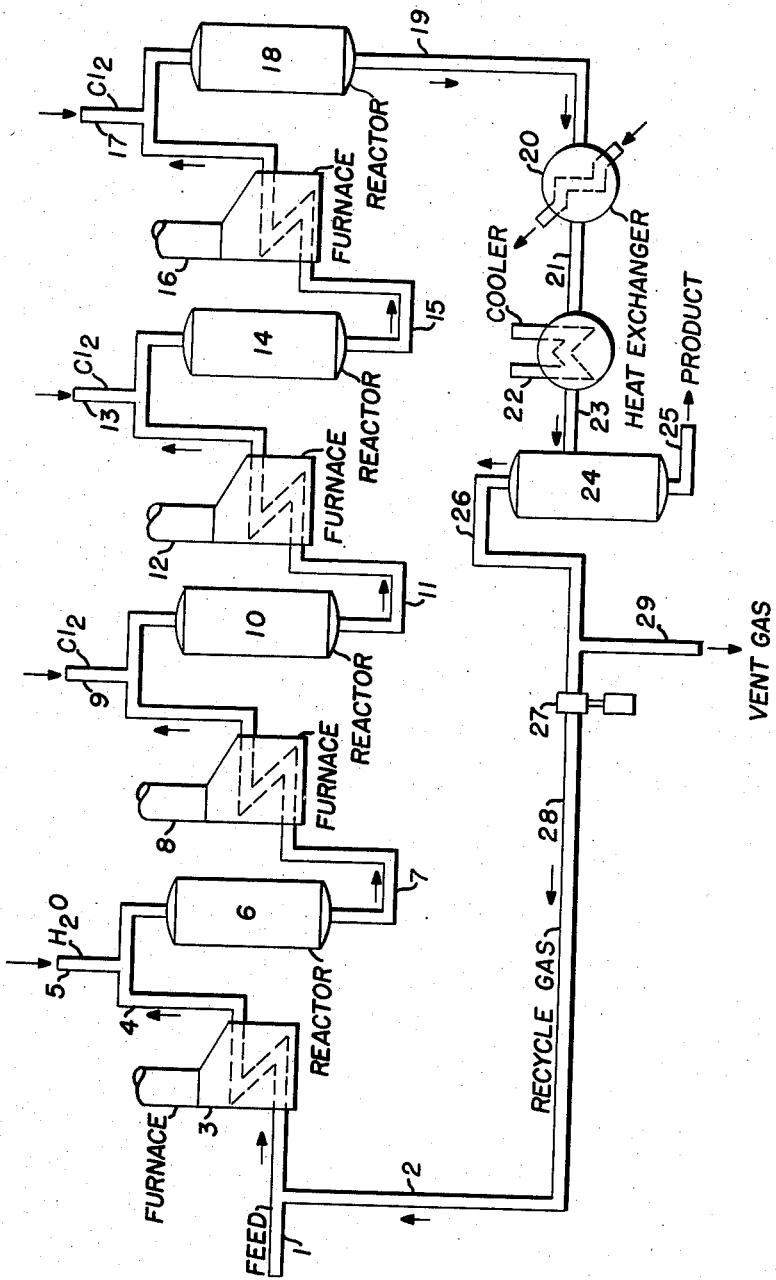

2,885,345

HYDROFORMING OF A NAPHTHA WITH THE ADDITION OF CHLORINE IN THE SECOND STAGE OF A TWO STAGE HYDROFORMING PROCESS, WITH THE USE OF A PLATINUM CONTAINING CATALYST

Charles E. Hemminger, Westfield, Richard H. Dudley, Cranford, and Robert B. Long, Wanamassa, N.J., assignors to Esso Research and Engineering Company, a corporation of Delaware Application September 30, 1954, Serial No. 459,373

1 Claim. (Cl. 208—65)

The present invention relates to improvements in hydroforming of naphthas using a platinum catalyst carried on alumina, which catalyst also contains chlorine or other halogen.

More particularly, the present invention relates to improvements in the hydroforming of naphthas in which controlled amounts of a halogen, such as chlorine, is added to the feed of a multi-stage process. The amount of halogen to be added to each of the reaction zones depends upon the amount of water in the feed, the type of catalyst, the temperature, the severity of temperature, and the like. In general, it can be stated that the amount of, say, chlorine to be added to the feed to each of the reactors is such that the halogen content ranges from 0.03 to 1.5 wt. percent of the catalyst. It is generally known that a platinum-containing catalyst has from about 0.05 to 2% halogen along with 0.1 to 1.0 wt. percent platinum carried on an active form of alumina when charged. Since the halogen is slowly lost from the catalyst during operations, it must be replaced by a halogen in the feed. Now, if all the chlorine necessary to give the desired catalyst activity is added to the feed of the first reactor, the results are unsatisfactory due to the fact that in the first stage of a multi-stage process, the main reaction is one of dehydrogenation of naphthenes in the feed to the corresponding aromatics. In the subsequent stages, however, it is desired to effect some hydrocracking of the paraffins which are invariably contained in the feed. Hence, if the quantity of chlorine or other halogen were added to the first stage of the multi-stage process, the subsequent reactors would receive insufficient chlorine and the activity would decrease.

It is also pointed out that most naphtha feeds contain the necessary chlorine or other halogen for the activity desired in the first reactor so that no additional halogen need be added to the first reactor. As previously pointed out, therefore, the invention here is to add chlorine to the stages of the multi-stage process which are subsequent to the first or second reactor.

In the first reactor in multi-stage hydroforming, using a platinum catalyst, the reaction involved is primarily the conversion of naphthenes to aromatics by dehydrogenation. A minimum amount of hydrocracking is desired in this first reactor and, therefore, only about 0.05–0.8 wt. percent chlorine should be present on the catalyst in the first stage. This is usually supplied by the chlorine in the initial catalyst charge and maintained by the natural chlorine content of the feed stock. However, in the second reactor, and subsequent reactors, isomerization of $C_5$ ring naphthenes to $C_6$ ring naphthenes, and accompanying dehydrogenation of the latter naphthenes to aromatics occur. Isomerization is accelerated by a halogen or a chlorine-containing catalyst and, consequently, the chlorine on the catalyst in the second reactor is, preferably, in the order of 0.3–1.0 wt. percent based on the total weight of the catalyst. This is maintained by feeding about 3 to 20 weight parts per million or more chlorine based on the weight of the effluent from the first reactor before it passes to the second reactor. The quantity of chlorine or other halogen to be added depends upon the moisture content in the feed, the natural chlorine in the feed, the type of catalyst employed and the operating conditions.

In order to give the maximum yield, high volatility and high lead susceptibility, as stated, a controlled amount of hydrocracking is necessary in the last reactor or reactors. To attain this end, the catalyst should contain from 0.5–1.5 wt. percent chlorine with about 0.7–1.2%, being the preferred range. Since this chlorine content is greater than in the prior practice, it is necessary, according to the present invention, to add chlorine to the feed as they enter these latter reactors. If a fourth or fifth reactor is employed, higher chlorine contents are used. About 0.3–0.7 wt. percent, based on the catalyst, is added to each successive reactor.

In the accompanying drawing there is shown, diagrammatically, an apparatus layout in which a preferred modification of the present invention is set forth. In this modification, four reactors operating in series are shown.

Referring in detail to the drawing, 1 represents the feed inlet for the naphtha to be hydroformed and 2 represents a feed line for a hydrogen-containing gas. The hydrogen-containing gas and the feed oil are fed to furnace 3 where they are heated to a temperature of about 900°–935° F. The mixture of oil and hydrogen-containing gas is withdrawn from furnace 3, through line 4 and passed through the first reactor 6, wherein it is contacted with a fixed bed of a platinum-containing catalyst. Under conditions more fully set forth hereinafter, the desired reaction occurs. It may be desired to add water in controlled amounts through line 5 to prevent excessive hydrocracking of paraffins and naphthenes in the feed. The product is withdrawn from reactor 6, through line 7, and passed to a second furnace 8 wherein it is reheated to a temperature of about 900°–975° F. At this point, it is noted that chlorine may be added through line 9. Any halogen-containing compounds, such as hydrogen chloride, chlorine itself, or hydrogen fluoride may be added. The reheated product is then passed to reactor 10 wherein further conversion of the feed stock is achieved. The product is withdrawn from reactor 10, through line 11 and thence passed to a heater 12 where it is heated to a temperature of 900°–975° F. and again passed to a third reactor 14, containing a bed of catalyst. Chlorine may be added via line 13. The product in this reactor is withdrawn through line 15, reheated in a furnace 16 and passed to the fourth in the series of reactors, 18. Here, also, chlorine may be added through line 17. The product is withdrawn through line 19, passed through a heat exchanger 20, thence passed through line 21 to a cooler 22 wherein the product is cooled to a temperature of about 100° F., thence passed via line 23 to a product recovery system 24. From product recovery system 24, the hydroformate is recovered through line 25. Recycle gas, that is, the hydrogen-containing gas, is recovered overhead through line 26, compressed in compressor 27 and recycled through line 28 to line 2 for further reuse in the process. Excess gas may be rejected from the system through line 29.

In order further to explain the present invention, the following data is set forth.

It has been known in past art that the addition of chlorine to the fresh feed of a platinum hydroforming operation will increase the activity and hydrocracking activity of the catalyst. As illustrated in the following table, when the chlorine content of the catalyst is over 1%, excessive conversion of the feed to light hydrocarbons results, because of the conversion of naphthenes to light hydrocarbons in the first reactor. By light hydrocarbons is meant methane, ethane, butane, propane and similar products.

In order to show the advantage of the present invention the following specific example is set forth. In this example the catalyst was one containing 0.6 wt. percent platinum on alumina made by the alcoholate method. The temperature was 900° F. and the pressure 200 p.s.i. In a four reactor system the weight percent of chlorine on the catalyst in the second reactor was 0.5 wt. percent. Under the conditions specified the volume percent of $C_5+$ hydrocarbons at 95 octane number was 86.5. In the third reactor, where the weight percent chlorine was 1.5%, the volume percent of $C_5+$ product was 86.1. In the third reactor where the chlorine content was above 1.5 wt. percent, the yield at 95 octane number decreased below 85%. These data show that in the reactors following the first reactor, the weight percent of chlorine on the catalyst should be from 0.5 to 1%, but should not be over 1.5 wt. percent because of excess hydrocracking to degradation products.

When employing four reactors in series, experimental data has shown that chlorine was lost from the latter reactors because of the higher average temperatures in those reactors.

In a standard test it has been shown that as the feed passes successively or serially through a number of reactors, it is necessary to add chlorine or some other halogen to the feed entering the various reactors in order to maintain catalyst activity, particularly, to increase activity with respect to he hydrocracking of paraffins, and thus to prepare a product which, not only has high octane rating, but has the proper volatility. This is illustrated in the following data for catalyst removed from each of four reactors after 2136 hours of a continuous operation. The relative activity of the catalyst removed from the several reactors was determined by a standardized test of a sample of each of the catalyst portions in the several reactors.

| Reactors | Chlorine Content | Relative Activity |
|---|---|---|
| 1 | 0.63 | 125 |
| 2 | 0.41 | 75 |
| 3 | | 55 |
| 4 | 0.39 | 50 |

Relative activity is the ratio of weights of a standard hydroforming catalyst to the weight of catalyst in the several reactors under the above test to give the same octane number product when tested under the same hydroforming operating conditions.

With respect to the data set forth above, showing a decline in activity in reactors 2-4, the catalyst may be brought back to relative activities of 100 or better by adding chlorine. This is illustrated by an experiment in which catalyst containing 0.6% chlorine, had a relative activity of 100. After use, the catalyst was deactivated to a relative activity of 50 when it contained 0.1% chlorine. This deactivated catalyst was treated with chlorine to raise the level from 0.1 to 0.8%, whereupon the relative activity was increased to 150.

The conditions for good operation are the following:

| | Range | Preferred |
|---|---|---|
| Temperature, ° F | 850–975 | 875–925 |
| Pressure, p.s.i.g. | 150–1,000 | 200–500 |
| Contact Time, lbs. oil per hr. per lbs. catalyst in reactor | 0.5–5.0 | 1–3 |
| Percent by weight halogen (e.g. chlorine) based on the catalyst in the first reactor | 0.03–1.0 | 0.05–0.8 |
| Weight percent of chlorine added based on catalyst in: | | |
| Second Reactor | 0.1–1.5 | 0.3–1.0 |
| Third Reactor | 0.5–2.0 | 0.7–1.2 |

The present invention, in brief compass, relates to maintaining, after the first reactor, the activity of the catalyst to produce hydroformate, not only of high octane rating, but of the proper volatility. This is accomplished by adding halogen or halogen containing compounds to the feed to successive reactors following the first reactor in a multi-stage operation.

What is claimed is:

In a multi-stage hydroforming process wherein a virgin naphtha is successively contacted in the presence of free hydrogen in a series of more than two reactors with a catalyst comprising chlorine and platinum carried on alumina, at a temperature in the range of 850° to 975° F., a pressure in the range of 150 to 1000 p.s.i.g., and a feed rate in the range of 0.5 to 5.0 lbs./hr./lb. of catalyst in each reactor, and wherein chlorine is slowly lost from said catalyst; the improvement which comprises maintaining the activity of said catalyst by adding a volatile chlorine-containing compound to the feed to the second and subsequent zones in amounts sufficient to maintain the chlorine content of the catalyst in said second zone in the range of 0.5–1.0 wt. percent, and in subsequent zones in the range of 0.5 to 1.5 wt. percent, based on catalyst, the chlorine content of the catalyst in the first zone being maintained in the range of 0.05–0.63 wt. percent, based on catalyst, by chlorine compounds naturally present in the feed, whereby dehydrogenation reactions predominate in the first zone and hydrocracking reactions predominate in subsequent zones.

References Cited in the file of this patent

UNITED STATES PATENTS

| 2,596,145 | Grote | May 13, 1952 |
| 2,642,384 | Cox | June 16, 1953 |
| 2,659,692 | Haensel | Nov. 17, 1953 |

FOREIGN PATENTS

| 511,278 | Belgium | May 31, 1952 |